(12) United States Patent
Wisherd et al.

(10) Patent No.: US 7,755,541 B2
(45) Date of Patent: Jul. 13, 2010

(54) SYSTEM AND METHOD FOR TRACKING VEHICLES AND CONTAINERS

(75) Inventors: David S. Wisherd, Carmel, CA (US); Robert W. Boyd, Eidson, TN (US); Tom Richardson, White Pine, TN (US); Santiago Romero, Mount Airy, MD (US); Michael A. Wohl, Rogersville, TN (US)

(73) Assignee: Wherenet Corp., Santa Clara, CA (US)

( * ) Notice: Subject to any disclaimer, the term of this patent is extended or adjusted under 35 U.S.C. 154(b) by 328 days.

(21) Appl. No.: 12/028,894

(22) Filed: Feb. 11, 2008

(65) Prior Publication Data

US 2008/0191937 A1 Aug. 14, 2008

Related U.S. Application Data

(60) Provisional application No. 60/889,635, filed on Feb. 13, 2007.

(51) Int. Cl.
*G01S 5/14* (2006.01)
*H04L 12/58* (2006.01)
(52) U.S. Cl. ............................... 342/357.03; 455/412.1
(58) Field of Classification Search ............ 342/357.03; 455/412.1
See application file for complete search history.

(56) References Cited

U.S. PATENT DOCUMENTS

| 5,376,943 | A | 12/1994 | Blunden et al. | 343/795 |
|---|---|---|---|---|
| 5,604,715 | A | 2/1997 | Aman et al. | 367/118 |
| 5,920,287 | A | 7/1999 | Belcher et al. | 342/450 |
| 5,995,046 | A | 11/1999 | Belcher et al. | |
| 6,026,378 | A | 2/2000 | Onozaki | 705/28 |
| RE36,791 | E | 7/2000 | Heller | 342/465 |
| 6,084,513 | A | 7/2000 | Stoffer | 340/572.1 |
| 6,121,926 | A | 9/2000 | Belcher et al. | 342/450 |
| 6,127,976 | A | 10/2000 | Boyd et al. | 342/463 |
| 6,281,970 | B1 | 8/2001 | Williams et al. | |
| 6,317,082 | B1 | 11/2001 | Bacon et al. | 342/465 |
| 6,356,802 | B1 | 3/2002 | Takehara et al. | 700/215 |
| 6,380,894 | B1 | 4/2002 | Boyd et al. | 342/450 |
| 6,434,194 | B1 | 8/2002 | Eisenberg et al. | 375/238 |

(Continued)

OTHER PUBLICATIONS

Search Report and Written Opinion for PCT/US08/01836 dated Dec. 5, 2008.

(Continued)

*Primary Examiner*—Thomas H. Tarcza
*Assistant Examiner*—Harry Liu
(74) *Attorney, Agent, or Firm*—Alston & Bird LLP

(57) ABSTRACT

A location system for tracking assets within a terminal includes a Differential Global Positioning System (DGPS) reference receiver within the terminal that receives GPS signals and generates DGPS correction data. In one aspect, a roving receiver unit is carried by an asset to be tracked within the terminal. It includes a GPS receiver that receives GPS signals and the DGPS correction data from the DGPS reference receiver. A tag transmitter transmits a wireless RF signal containing GPS location data based on received GPS signals and DGPS correction data. At least one access point is positioned within the terminal for receiving the wireless RF signal from the tag transmitter. A processor is operatively connected to the at least one access point for receiving GPS location data and determining a location of the asset to be tracked.

25 Claims, 13 Drawing Sheets

U.S. PATENT DOCUMENTS

| | | | |
|---|---|---|---|
| 6,490,524 B1 | 12/2002 | White et al. ................. | 701/215 |
| 6,502,005 B1 | 12/2002 | Wrubel et al. .............. | 700/116 |
| 6,577,921 B1 | 6/2003 | Carson ....................... | 700/214 |
| 6,593,885 B2 | 7/2003 | Wisherd et al. ............. | 342/463 |
| 6,655,582 B2 | 12/2003 | Wohl et al. .................. | 235/380 |
| 6,657,586 B2 | 12/2003 | Turner .................... | 342/357.07 |
| 6,665,585 B2 | 12/2003 | Kawase ..................... | 700/226 |
| 6,700,533 B1 * | 3/2004 | Werb et al. ............. | 342/357.07 |
| 6,812,839 B1 | 11/2004 | Belcher et al. ........... | 340/572.1 |
| 6,853,687 B2 | 2/2005 | Harrington et al. .......... | 375/259 |
| 6,859,485 B2 | 2/2005 | Belcher ...................... | 375/130 |
| 6,892,054 B2 | 5/2005 | Belcher et al. ............. | 455/63.1 |
| 2001/0010495 A1 | 8/2001 | Helms et al. ............. | 340/572.7 |
| 2002/0030597 A1 | 3/2002 | Muirhead .................... | 340/572.1 |
| 2002/0070891 A1 | 6/2002 | Huston et al. .......... | 342/357.09 |
| 2002/0181565 A1 | 12/2002 | Boyd et al. ................. | 375/152 |
| 2003/0137968 A1 | 7/2003 | Lareau et al. ............... | 370/349 |
| 2003/0191555 A1 | 10/2003 | Takehara et al. ............ | 700/215 |
| 2004/0102870 A1 | 5/2004 | Andersen et al. ............ | 700/215 |
| 2004/0249557 A1 | 12/2004 | Harrington et al. .......... | 701/115 |
| 2005/0256608 A1 | 11/2005 | King et al. .................. | 700/213 |
| 2005/0280512 A1 | 12/2005 | Forster .................... | 340/572.7 |
| 2006/0022867 A1 | 2/2006 | Hessing | |
| 2006/0038683 A1 | 2/2006 | Claessens et al. ........ | 340/572.1 |
| 2006/0158338 A1 | 7/2006 | King et al. .................. | 340/679 |
| 2006/0220851 A1 | 10/2006 | Wisherd .................. | 340/568.1 |
| 2007/0021915 A1 | 1/2007 | Breed et al. | |
| 2007/0155368 A1* | 7/2007 | Phelan ..................... | 455/412.1 |
| 2007/0222674 A1 | 9/2007 | Tan et al. ................ | 342/357.02 |

OTHER PUBLICATIONS

Molisch et al., "*MIMO Systems With Antenna Selection—An Overview,*" Mar. 2004, pp. 1-18.

"*Position Tracking Interface Unit (PTIU) for RTG's,*" Paceco Corp., www.pacecocorp.com, pp. 1-6.

Jorichs, Von Hartmut, "*Neue Systeme zur Steuerung von Flurforderzeugen,*" Technische Rundschau, Jan. 6, 1989, pp. 34-39.

"Wherenet Introduces Wireless Locations Solution for Marine Terminals," Online, Oct. 21, 2003, www.wherenet.com/pressreleases/pr_10212003.html, 2 pages.

"Dockside Cranes Get Brains," RFID Journal, Online, Oct. 29, 2003, www.rfidjournal.com/article/articleview/630/1/17, 2 pages.

"WhereLan," Online, 2003, www.wherenet.com/pdfs/wherelan%204.9.04.pdf, 1 page.

"WhereTag III," Online, 2003, www.wherenet.com/pdfs/wheretag%20III.5.3.0.pdf, 1 page.

"WherePort III," Online, 2003, www.wherenet.com/pdfs/whereport.10.1.0.pdf, 2 pages.

* cited by examiner

SYSTEM AND METHOD FOR TRACKING VEHICLES AND CONTAINERS

RELATED APPLICATION

This application is based upon prior filed provisional application Ser. No. 60/889,635 filed Feb. 13, 2007.

FIELD OF THE INVENTION

This invention relates to location systems, and more particularly, this invention relates to location systems that use Global Positioning Systems (GPS) and Real-Time Location Systems (RTLS) for tracking vehicles and other assets such as in a marine terminal.

BACKGROUND OF THE INVENTION

Commonly assigned U.S. Patent Publication No. 2006/0220851, the disclosure which is hereby incorporated by reference in its entirety, discloses a system and method for tracking containers in grounded marine terminal operations. The system tracks cargo containers and vehicles contained within a terminal and includes a tag transmitter positioned on container handling equipment, containers, cranes and other marine terminal equipment. In that disclosure, the tag transmits a wireless RP signal based on an event affecting the location of a container handled by the container handling equipment. A plurality of spaced apart access points are positioned at known locations within the terminal that receive the wireless RF signals from the tag transmitter. A processor is operatively connected to the locating access points for geolocating the tag transmitter and determining the container location at the time the event occurs such as by using time difference-of-arrival measurements. GPS sensors can be located on equipment masts or other locations to enhance the system.

Some location systems are now using a differential global positioning system (DGPS) as an enhancement to global positioning systems in which one or a network of fixed ground based reference stations (receivers) broadcast a difference between the positions indicated by a satellite system and known fixed positions. The stations can broadcast differences between the measured satellite pseudoranges and actual or internally computed pseudoranges. It is possible to use an "inverse" DGPS enhancement. The term "inverse" could apply to correcting position data at a control center, dispatcher site or other processor. These systems provide better accuracy than using GPS systems alone because several sources of error can occur with GPS alone. These sources of error include ionospheric effects and errors in the satellite position ephemeris data and clock drift on the satellites. The DGPS correction signal can correct for these effects and reduce error significantly depending on the amount of data that is sent, and some accuracies can be obtained that are less than 20 cm and in some instances, under better conditions, accuracies can be achieved of under 10 cm.

SUMMARY OF THE INVENTION

A location system for tracking assets within a terminal includes a Differential Global Positioning System (DGPS) reference receiver within the terminal that receives GPS signals and generates DGPS correction data. The term terminal could include a marine terminal or other campus-type location. In one aspect, a roving receiver unit is carried by an asset to be tracked within the terminal. It includes a GPS receiver that receives GPS signals and the DGPS correction data from the DGPS reference receiver. A tag transmitter transmits a wireless RF signal containing GPS location data based on received GPS signals and DGPS correction data. At least one access point is positioned within the terminal for receiving the wireless RF signal from the tag transmitter. A processor is operatively connected to the at least one access point for receiving GPS location data and determining a location of the asset to be tracked.

The location system in one aspect includes a plurality of spaced apart access points positioned at known locations within the terminal and operative with the roving receiver unit and the processor as a Real-Time Location System (RTLS) for augmenting any determination of asset position based on GPS. This processor can determine which signals are first-to-arrive signals and conduct differentiation of the first-to-arrive signals relative to the access points to locate the tag transmitter. In one aspect, the RF signal can be formed as a pseudo random spread spectrum RE signal.

The roving receiver unit, any access points and processor can operate together as a wireless Local Area Network (LAN). A receiver processor within the roving receiver unit can cache GPS data relating to a number of sensed locations and compile the data into a single data packet for transmission. The network processor is operative for processing real-time Dynamic Link Library (DLL) output data as Kinematic baseline vectors for GPS differential processing. The network processor can be operative for processing the DLL output data within a North-East-Down (NED) system.

In one aspect, the asset to be tracked can be formed as container handling equipment or a container. The RE signal can be transmitted from the tag transmitter based on an event affecting the location of the container handled by container handling equipment. An antenna mast can be mounted on the container handling equipment or other equipment, including a container, and support a roving receiver unit at a height above the stack height of any containers to allow line-of-site transmission to the at least one access point.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1A:
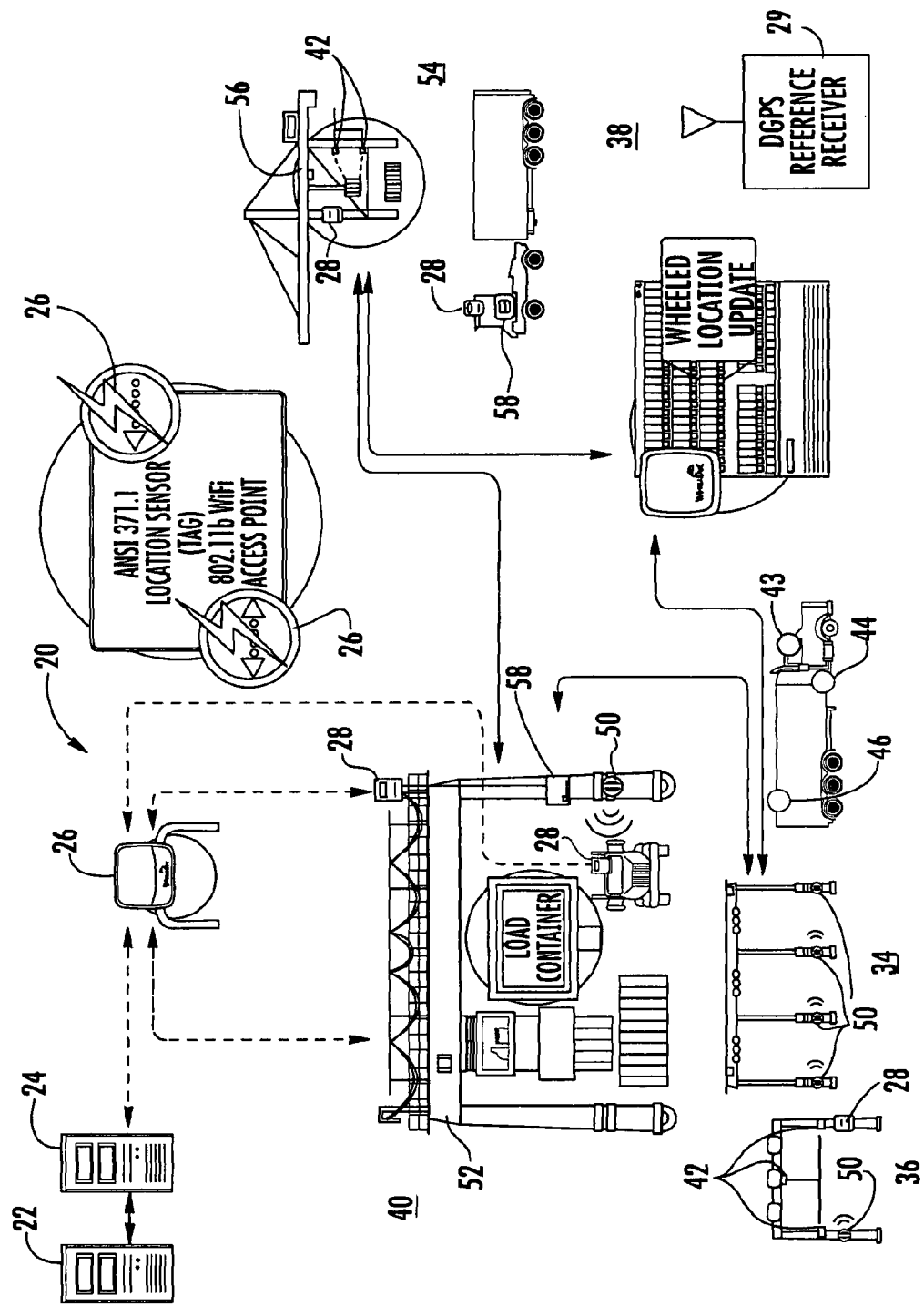
FIG. 1A is a fragmentary, environmental view of a location system for locating containers in a marine terminal that is enhanced with a DGPS reference receiver and tag transmitters that are also operative as a Real-Time Location System (RTLS).

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A location system implements GPS location augmented by a Real-Time Location System (RTLS) for locating a number of tracked items or assets across an area, such as a marine terminal or other area, including a campus area. These assets could include containers, container handling equipment, or other vehicles and assets. Although the description proceeds with a marine terminal as a non-limiting example, any terminal or area requiring the location of assets can be covered or included. The performance and reliability of data telemetry communication with tracked assets is improved. Any periodic disruptions of the telemetry data link are minimized and the data transmission required for a given amount of data bandwidth available is minimized. The use of a GPS system is particularly valuable for augmentation by a Real-Time Location System (RTLS) and wireless telemetry connection to each GPS tracked asset. In one non-limiting aspect, GPS data at the tracked asset is collected for N number of location fixes before compiling the data into a single data transmission packet. This minimizes the overhead (headers, encryption, error correction, etc.) associated with each generated data packet. Packets can be sent randomly in time from each tracked asset to optimize telemetry bandwidth usage. In special situations, such as a detected transaction for the tracked asset or a query from the host system, for example, using a location processor operative as a network processor, the transaction is sent as soon as possible with priority over any normal random asset location data. The data can be compressed if no movement is detected over the data collection period. Some or all of the point-by-point movement data can be replaced by velocity, acceleration and/or geometry of route data. The data collected at the tracked asset during a period of lost telemetry connection can be stored to the host, for example, a location processor, until a connection is re-established. The system includes an inverse DGPS system for marine terminal or similar applications in one non-limiting example. A centralized local area DGPS solution has a low per-receiver cost to improve telemetry efficiency by using data caching.

A real-time RtDLL system such as provided from Waypoint Consulting (Novatel) of Calgary, Alberta, Canada can be incorporated into the location system as part of the "blink" service for tag transmitters, providing a robust centralized carrier phase algorithm with floating ambiguity resolution. Reliable (<20 cm) performance is common with little concern for cycle slips that are possible with integer techniques. Receiver (x-y-z) position and velocity can be provided by the blink service in a local NED (North-East-Down) system.

The RtDLL system uses a Dynamic Link Library (DLL) and processes raw GPS measurement records from a reference DPGS receiver and at least one multiple roving receiver unit, and typically multiple roving receiver units positioned on assets to be tracked. For example, these records are generated as a common GPS epoch. Data caching improves telemetry efficiency by avoiding packet collision on the backhaul.

Modifications to the "blink" server as a network or location processor extracts and aligns measurement records from cached receiver data. Location latency of material transactions are minimized by "fast forwarding," i.e., rapidly processing cached data up to transaction time. Cache sizes are a configurable compromise between non-transaction solution latency and backhaul packet size. Data recording supports post processing for diagnostics.

A centrally located DGPS reference receiver generates raw measurement records at a fixed rate (1 Hz). A local network or location processor provides wired Ethernet connectivity with a server for data transport and maintenance functions. A local network processor, with an embedded WLAN client, caches an eventual packet transmission to the server at a reduced per-packet rate and protocol overhead. Transmissions can be dithered in time to reduce collisions. Material transactions can result in immediate, potentially partial, packet transmission to reduce latency.

The network or location processor can be embedded in a third generation location sensor such as manufactured by WhereNet is a suitable low cost candidate for WLAN client connectivity. This location sensor as a processor could be operative as an access point. This example could incorporate a royalty-free Linux kernel and network stack, and a mini-PCI for third party WLAN adaptors.

Local processing can generate compact binary formats from multiple receiver manufacturers, providing flexibility in future receiver selection, as in the following example:

1 Hz update rate
 12 satellites
 Representative Binary Packet Size=15+(11*N)+2 Bytes
 Average Data Rate=1*{15+(11*12)+2}=149 Bytes/s
 Caching Interval=15 s
 Packet Size (transmitted at ~15 s intervals)=15*149=2235 Bytes Roving receiver units could send 2235 byte packets every 15 seconds over a WLAN connection. Framework modification could support an additional packet type for transport. Much of the existing connection support in the framework could be re-used. Firmware maintenance in roving receiver units can exist via an LpManager software suite and associated module and functions.

The location points determined from the signals generated by roving receiver units can be transformed into a local map datum. The "blink" or tag service provides scaling, translation, and rotation of the RtDLL NED output.

The existing RTLS system in one non-limiting aspect provides the GPS augmentation. RTLS methods can sometimes prove to be more accurate, cost effective, and reliable than inertial techniques for augmenting GPS. The cost of suitable low drift inertial solutions increases with anticipated outage time. Any RTLS augmentation is typically loosely coupled.

In addition to accuracy, GPS receiver selection considers correlation performance, algorithm recovery times, and interface options. Antenna selection can have phase center stability and multi-path mitigation.

One marine terminal GPS system can include different components such as 1000 roving receiver units in a non-limiting example:

| DGPS Reference Receiver (1 per site) | |
| --- | --- |
| Quantity | Description |
| 1 | Novatel OEMV-1 (raw data output, packaged with integrated antenna) |
| 1 | Network Processor (wired Ethernet) |
| 1 | Packaging, power supply, cables etc. |

| Carrier Phase Rover (FEL) | |
| --- | --- |
| Quantity | Description |
| 1 | Novatel OEMV-1 (raw data output) |
| 1 | Waypoint RtDLL |
| 1 | MicroPulse 1370FW LightWeight Survey Antenna (26 dB) |
| 1 | Network Processor (WLAN client) |
| 1 | Packaging, DC-DC power supply, cables etc. |

| Carrier Phase Rover (UTR) | |
| --- | --- |
| Quantity | Description |
| 1 | Novatel OEMV-1 (raw data output, packaged with integrated antenna) |
| 1 | Waypoint RtDLL |
| 1 | Network Processor (WLAN client) |
| 1 | Packaging, DC-DC power supply, cables etc. |

It is possible to use a lightweight survey antenna that has low multipath, which can include ceramic filters.

A real-time location system and method used at a marine terminal such as initially disclosed in the incorporated by reference '851 patent publication can be modified for use in the system and method as described to include the described DGPS system and roving receiver units that are augmented by the TRLS system as described. Basic components, modules and functions for the RTLS part of the system are described in commonly assigned U.S. Pat. No. 6,657,586 and published patent application no. 2002/0181565, the disclosures of which are hereby incorporated by reference in their entirety. Similar, commonly assigned patents include U.S. Pat. Nos. 5,920,287; 5,995,046; 6,121,926; and 6,127,976, the disclosures which are hereby incorporated by reference in their entirety.

As noted in the '586 patent, GPS has been used with a tag signal reader or access point for adding accuracy. Also, a port device (either separate or part of an access point) can include circuitry operative to generate a rotating magnetic or similar electromagnetic or other field such that the port device is operative as a proximity communication device that can trigger a tag to transmit an alternate (blink) pattern. The port device acts as an interrogator, and can be termed such. Such an interrogator is described in commonly assigned U.S. Pat. No. 6,812,839, the disclosure which is incorporated by reference in its entirety. When a tag passes through a port device field, the tag can initiate a preprogrammed and typically faster blink rate to allow more location points for tracking a tagged asset, such as a vehicle hauling a container as it passes through a critical threshold, for example, a shipping/receiving backdoor or gate entry to a marine terminal with the RTLS and GPS system. Such tags, port devices, and Access Points are commonly sold under the trade designation WhereTag, WherePort and WhereLan by Wherenet USA headquartered in Santa Clara, Calif.

A system and method for tracking containers in a grounded marine terminal is first described, followed by a more detailed explanation of the system and method for tracking containers in grounded marine terminal applications using DGPS augmented by the RTLS.

The combination of the real-time location system and DGPS location system can provide one wireless infrastructure for all tagged assets such as containers, wheeled chassis, tractors, loaders, cranes, maintenance equipment, and other similar container handling equipment. In certain aspects of the description, the combination of the RTLS and DGPS will be referred to as the "location system." This location system provides real-time ID and location of every tag, and provides reliable telemetry to record transactions, and provides mobile communications to work instruction and data entry terminals. Any terminal operating (management) software (TOS) can be optimized by real-time location and telemetry data to provide real-time, exact-slot accuracy of container ID and location, and real-time location and automatic telemetry of container transactions and container handling equipment and other mobile assets. The location system is applicable for basic container storage as stacked containers (grounded) and parked containers on a chassis (wheeled).

FIG. 1 is a fragmentary environmental view of a location system 20 for locating containers in a marine terminal and showing various applications of this location system 20. A computer server 22 is operative with a terminal operating system (TOS) 24 and together could operate as a network processor or as a single unit. The server 22 and terminal operating system 24 provide a visibility software suite and marine module with a bidirectional terminal operating system interface that is operative with various access points 26. The server 22 also provides processing for receiving data signals from the access points 26, which had received wireless signals from tags 28. The wireless signals could include GPS data or any DGPS correction data from the DGPS reference receiver 29. The RF signal can also be used with multiple access points 26 for real-time location such as by sensing first-to-arrive signals and conducting differentiation of the first-to-arrive signals. The server 22 in this example can be operative as a location or network processor for determining which signals generated from the tag transmitted are first-to-arrive signals and conduct differentiation of these first-to-arrive signals relative to the location of the access points. The access points could also include global positioning systems to verify access point locations.

As shown, an access point 26 operates with WIFI 802.11b Standards and can use ANSI 371.1 Standards that incorporate communication standards for a 2.4 GHz air interface. The gate 34 could be operative with an Optical Character Recognition (OCR) terminal 36. A tag 28 is positioned at the gate to improve OCR transactions and track containers to wheeled 38 and grounded 40 positions. The OCR terminal 36 includes different OCR cameras 42. The tag placement options are shown as on a draymen's truck 43, trailer chassis 44 or container 46. At the grounded position 40, a port device 50 is shown positioned on the illustrated crane 52. The tag updates of a wheeled container in the wheeled position 78 could be operative such that no mobile inventory vehicle, magnet or clerk update is required. The server 22 and TOS 24 could also provide a user interface for a wheeled location update as illustrated.

In a vessel position 54, a tag 28 could be located with an OCR camera 42 for vessel unloading at a maritime crane 56. It should be understood that the tags can be used to upload maintenance and other information from the vehicle, such as hours of operation and fuel levels.

A telemetry unit, such as a VCOM unit or other position tracking interface unit (PTIU) 58, can transmit sensor data through the tag 28 and can report to the location system 20 when a chassis/container is disconnected from a tractor, such as when the driver parks the chassis/container or other similar events. The PTIU 58 can report to the location system 20 when a chassis/container is disconnected from a tractor, such as when the driver parks the chassis/container. The PTIU or other telemetry unit can transmit data from different sensors on the tractor, for example, a proximity sensor on the king pin, a pair of hydraulic sensors on the fifth wheel, and a reverse sensor as a non-limiting example. These three sensors could indicate when a container is engaged or disengaged. Other sensors could be monitored to determine an operator ID, collisions, fuel levels, usage statistics, and maintenance information that can be used to improve operational efficiency. In the different systems for processing containers through the marine terminal, the location system 20 tracks the location of containers continuously, such that the containers can be found more easily.

Figure 1B:
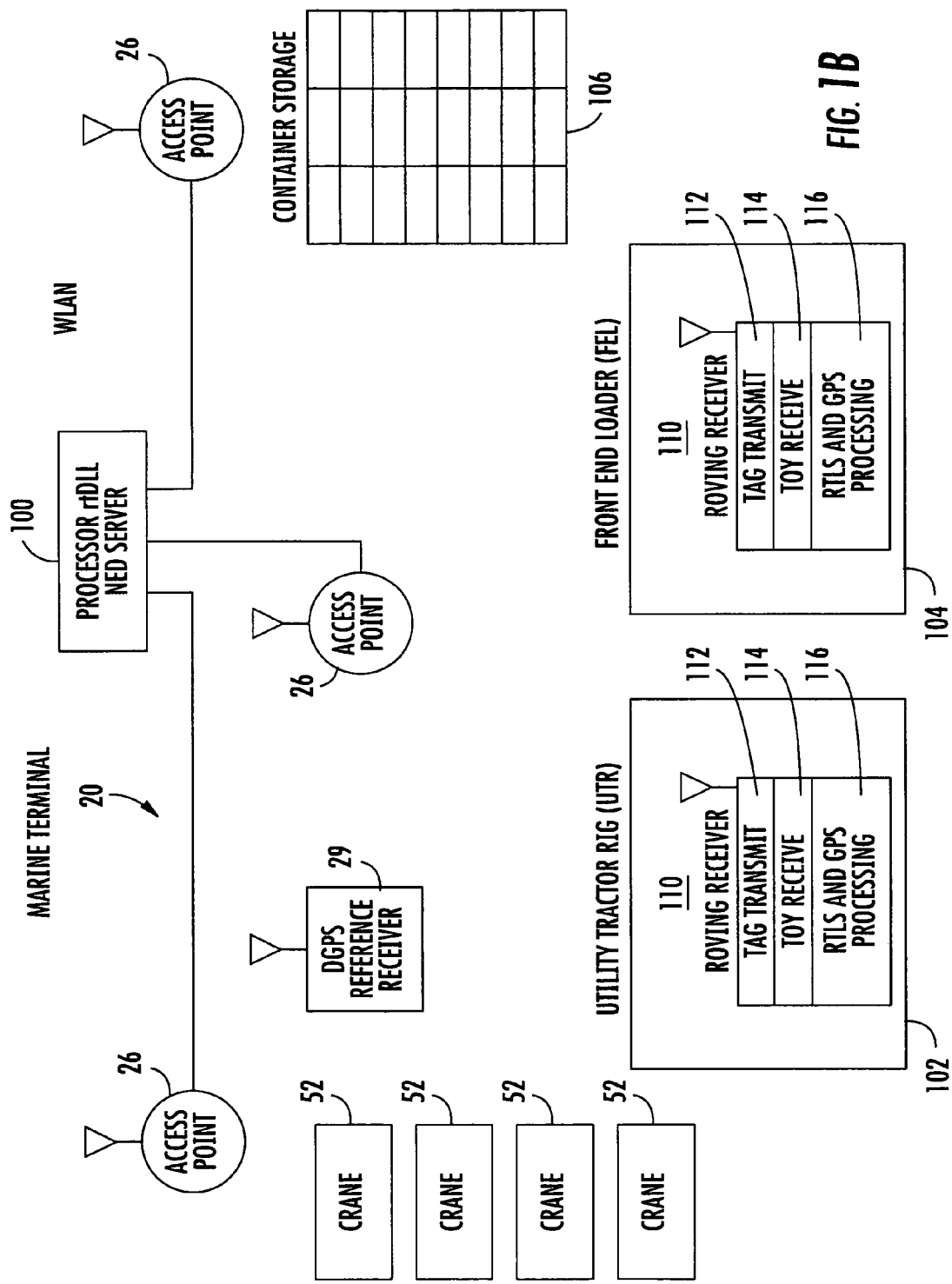
FIG. 1B is another, fragmentary environmental view similar to FIG. 1A and showing greater details of a roving receiver unit.

FIG. 1B is another, fragmentary environmental view similar to FIG. 1A but showing fewer components. The processor is illustrated at 100 and operative with the access points 26. The processor could correspond to the processor and server of FIG. 1. A Utility Tractor Rig (UTR) is shown in block format at 102, and a Front-End Loader (FEL) is shown in block format at 104. Containers are stored at a container storage 106. A roving receiver unit 110 includes a tag transmitter section 112, tag receiver section 114, and a processor that performs RTLS and GPS processing 116 for transmitting the RF signals that can be used for both the DGPS and RTLS location system 20.

The system can use a Windows-based real-time GPS processing program with a graphical user interface such as produced by NovAtel as the RTKNav system that collects real-time GPS measurement data from serial or network ports and can be re-directed or re-broadcasted to local or wide-area network ports. The system uses a Real-time Dynamic Link Library (RtDLL) as a GPS differential processing engine. It can combine GPS code and carrier phase processing that can attain accuracies higher than conventional DGPS and give GPS integrators Real-Time Kinematic (RTK) capabilities to their application. Data buffering can be used such as N epochs data. The entire precise positioning product such as the RTKNav and RtStatic systems provided by NovAtel can be used. Specific equipment could include the OEMVGNSS engine and the OEMV-1 product as a receiver. It can also include DGPS or L-band corrections. Further details can be found in the NovAtel Precise Positioning Product user guide for TRK Nov/RtStatic, the disclosure which is hereby incorporated by reference in its entirety.

Figure 2:
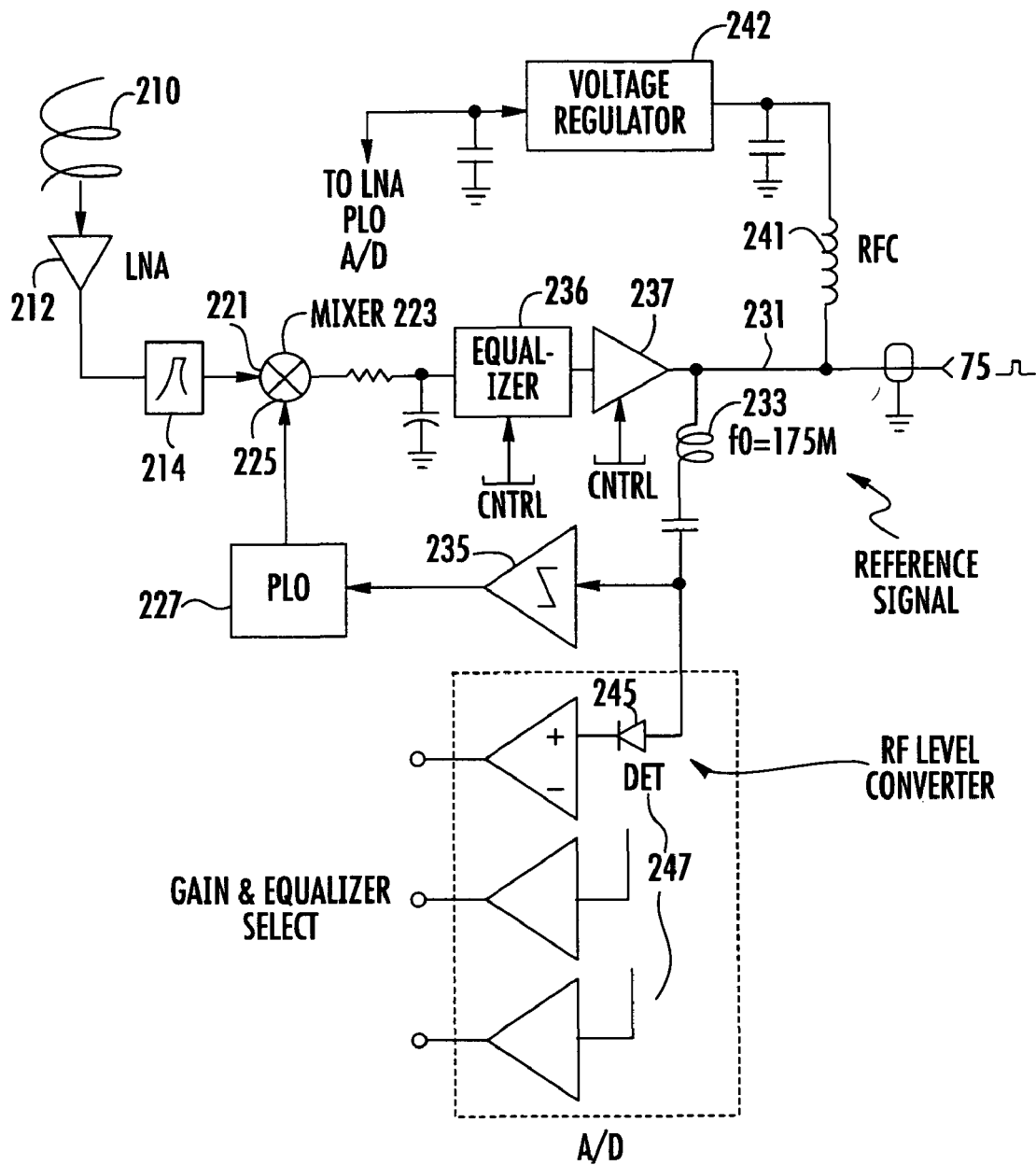
FIG. 2 is a high level block diagram of one example of circuit architecture that can be used for an access point.
Figure 3:
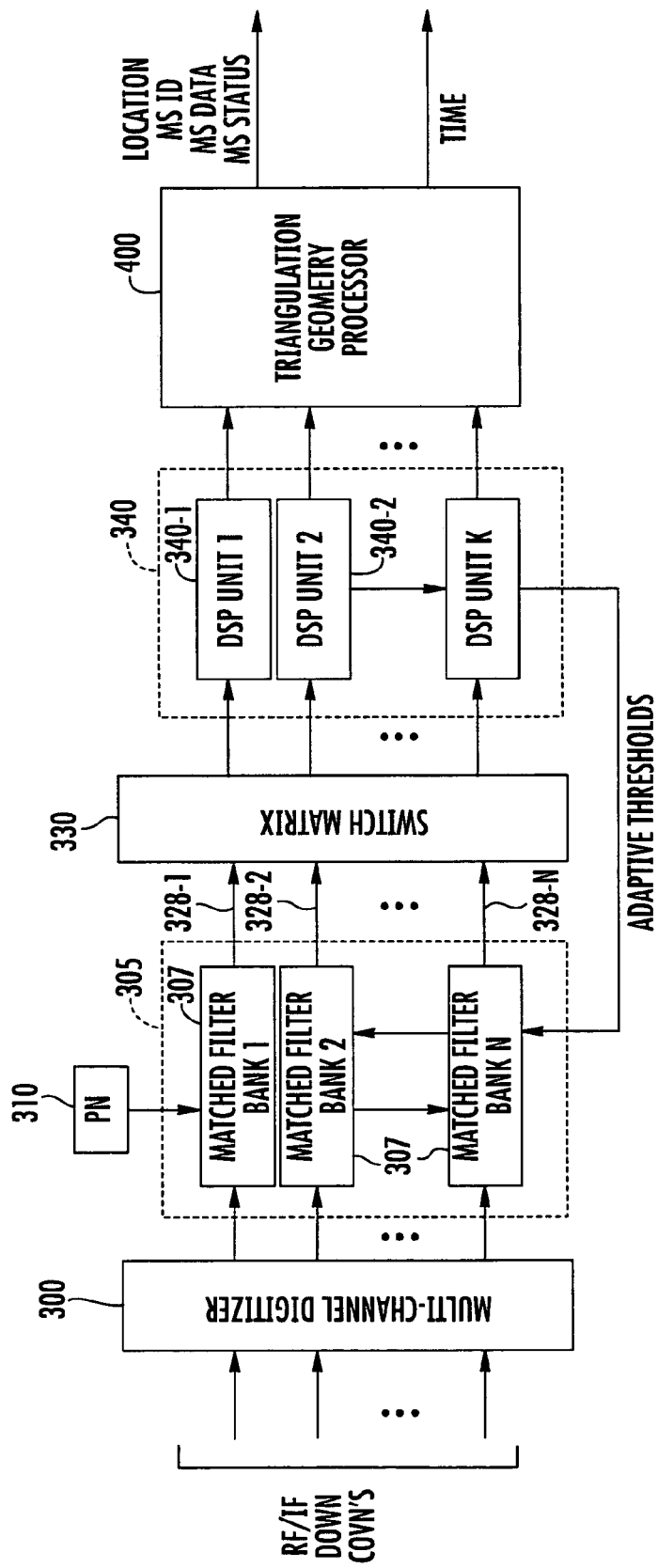
FIG. 3 is another high level block diagram of one example of circuit architecture that can be used for a correlation-based, RF signal location processor.

FIGS. 2 and 3 represent examples of the type of circuits that can be used with modifications as suggested by those skilled in the art for access point circuitry and location processor circuitry as part of a server or separate unit to determine any timing matters, set up a correlation algorithm responsive to any timing matters, and determine which tag signals are first-to-arrive signals and conduct differentiation of first-to-arrive signals to locate a tag or other transmitter generating a tag or comparable signal with the RTLS systems that is used to augment the GPS.

Referring now to FIGS. 2 and 3, a representative circuit and algorithm as described in the above mentioned and incorporated by reference patents are disclosed and set forth in the description below to aid in understanding the type of access point and location processor circuitry that can be used for determining which signals are first-to-arrive signals and how a processor conducts differentiation of the first-to-arrive signals to locate a tag transmitter.

FIG. 2 diagrammatically illustrates one type of circuitry configuration of a respective architecture for "reading" associated signals or a pulse (a "blink") used for location determination signals, such as signals emitted from a tag transmitter to a locating access point for RTLS. An antenna 210 senses appended transmission bursts or other signals from the object and tag transmitter to be located. The antenna in this aspect of the invention could be omnidirectional and circularly polarized, and coupled to a power amplifier 212, whose output is filtered by a bandpass filter 214. Naturally, dual diversity antennae could be used or a single antenna. Respective I and Q channels of a bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223, which has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor. The communication cable 231 also supplies DC power for the various components of the access point by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by those skilled in the art.

Figure 4:
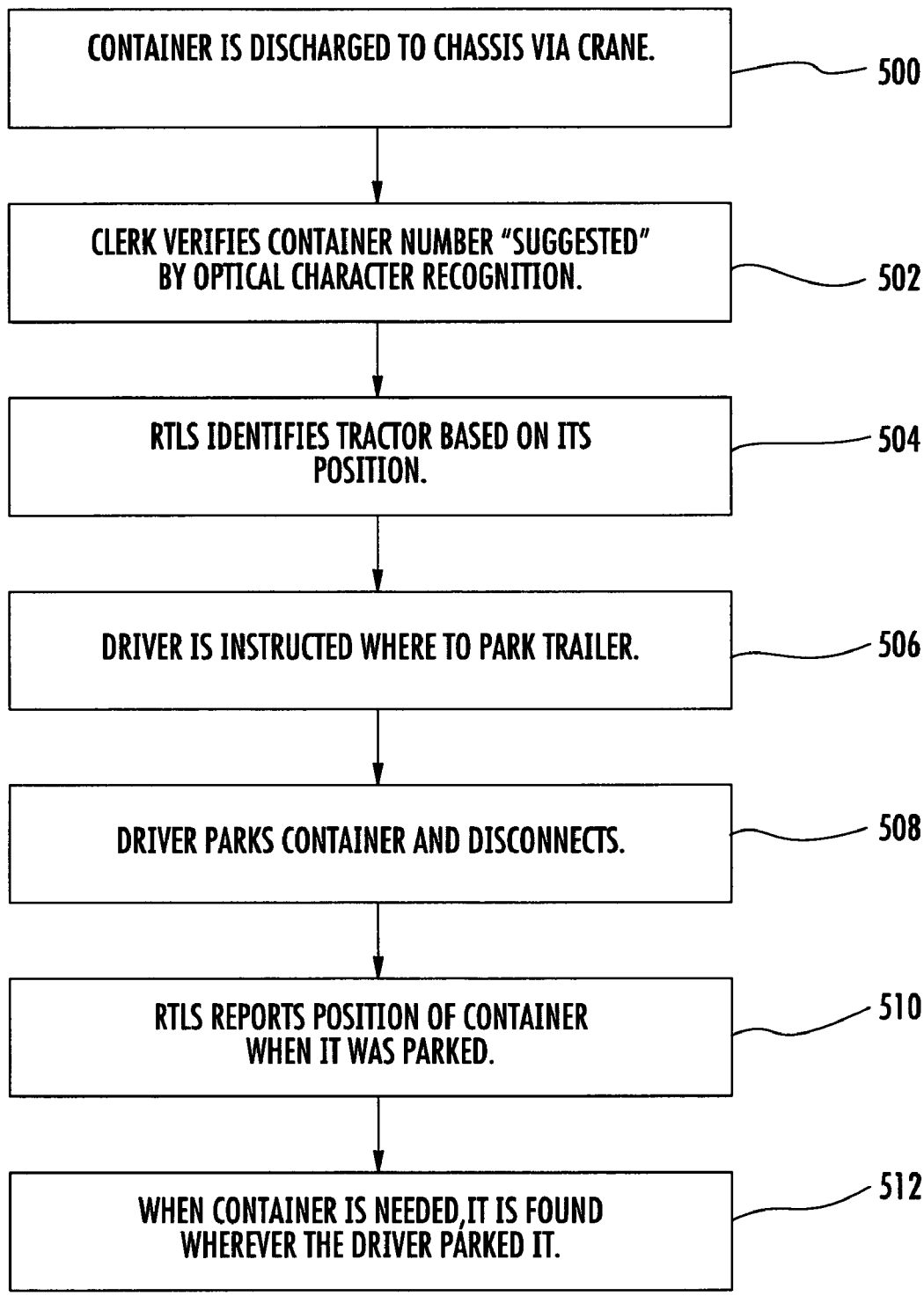
FIG. 4 is a high level flow chart illustrating the steps used when a container is unloaded from a vessel to a chassis.

FIG. 4 diagrammatically illustrates the architecture of a correlation-based, RF signal processor circuit as part of a location processor to which the output of a respective RF/IF conversion circuit of FIG. 3 can be coupled such as by wireless communication (or wired in some instances) for processing the output and determining location based on the GPS receiver location information for various tag signal readers. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each access point can be expected to receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 4, the RF processor employs a front end, multichannel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a database where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multipath effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor 26 could be modified to include a front end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor 26 could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

FIG. 4 is an example of a high level flow chart illustrating how the location system 20 can be used when a container is unloaded from a vessel to a chassis. Both the DGPS and RTLS systems can be used, or each used alone. Reference numerals begin in the 500 series.

As shown in the flow chart in FIG. 4, a container is discharged to the chassis via crane (block 500). A clerk could verify the container number "suggested" by optical character recognition (block 502), although OCR is not required or desired in some instances. The real-time location system 20 identifies the tractor based on its position (block 504). A driver can be instructed where to park the trailer (block 506). The driver parks the container and disconnects (block 508). The real-time location system 20 reports the position of the container when it is parked (block 510). When the container is needed, it is found wherever the driver parked it (block 512).

Figure 5:
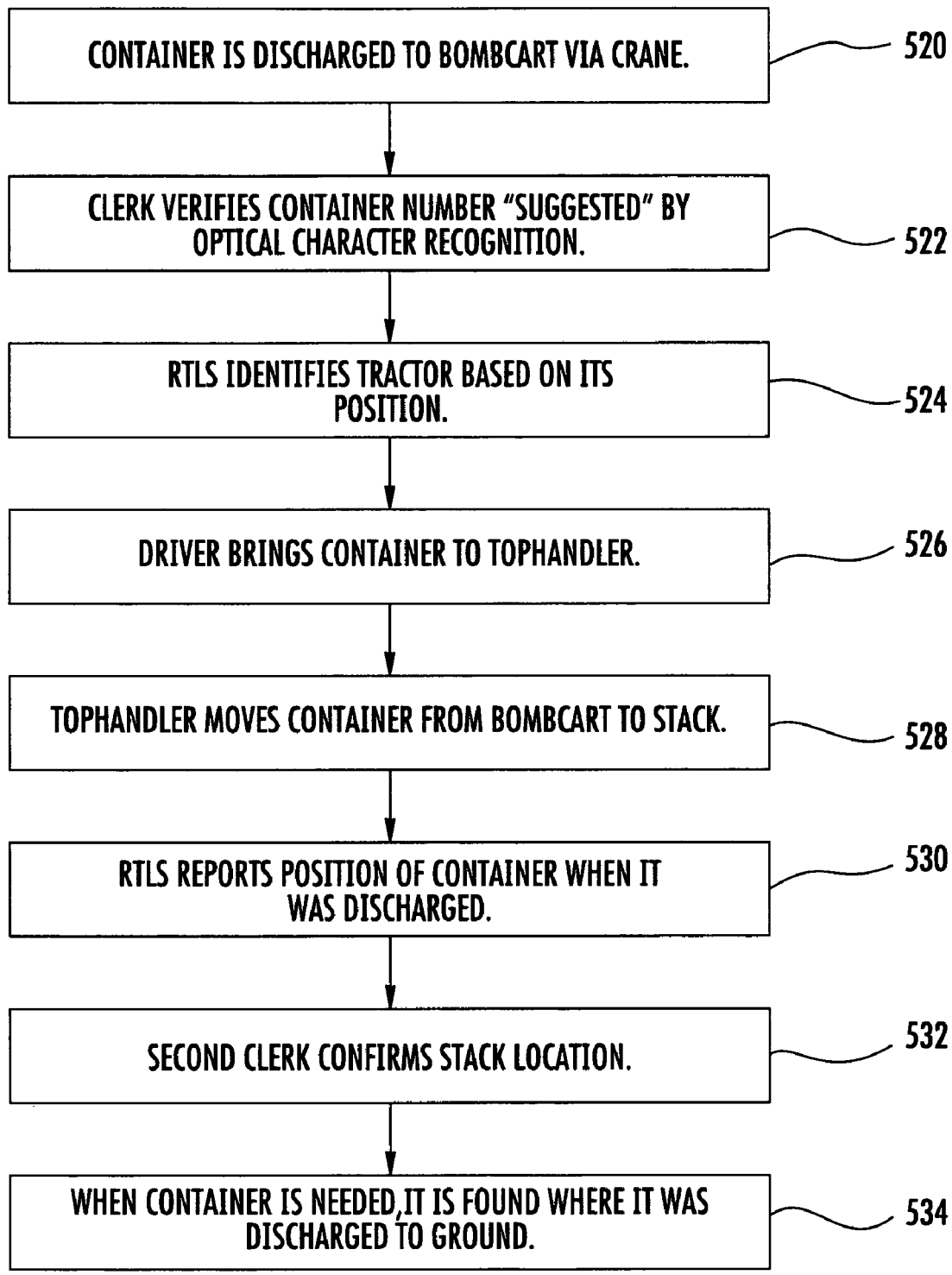
FIG. 5 is a high level flow chart illustrating the steps used when discharging a container from vessel to ground.

FIG. 5 shows a flow chart used when discharging from vessel to ground, in one non-limiting example. A container is discharged to a bombcart as a non-limiting example via crane (block 520). A clerk verifies the container number "suggested" by optical character recognition (block 522), although OCR is not required or desired in some instances. The location system 20 identifies the tractor based on its position (block 524). A driver brings the container to a top handler (block 526). The top handler moves the container from the bombcart to the stack (block 528). The location system 20 reports the position of the container when it is discharged (block 530). Another clerk could confirm stacked location (block 532). When a container is required, it is found where it was discharged to ground (block 534).

Figure 6:
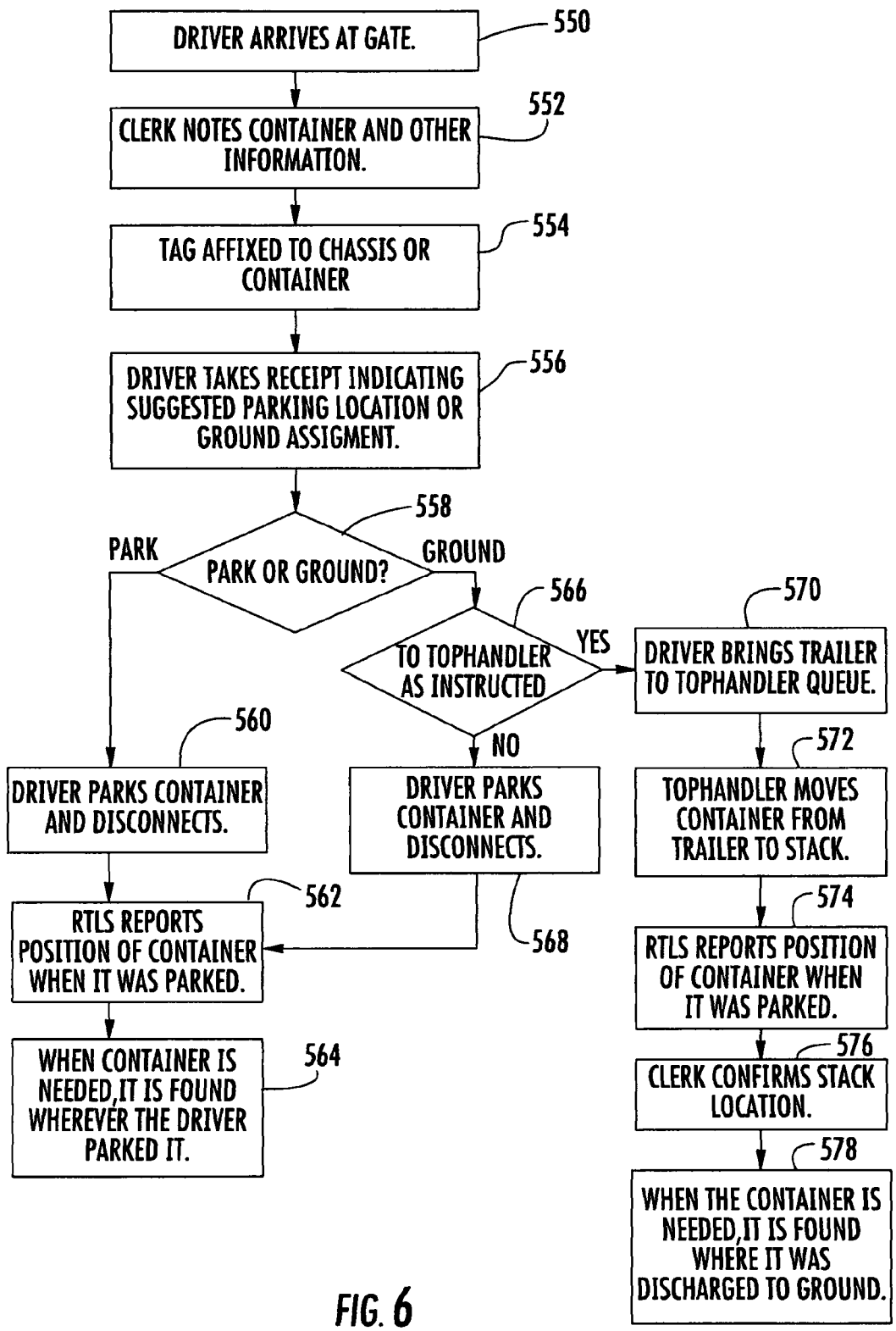
FIG. 6 is a high level flow chart of an example of processing containers through a gate of the marine terminal.

The location system 20 for tracking containers in a marine terminal can also be used when processing containers through a gate of the terminal, which involves similar issues as discharging containers from vessel to chassis and from vessel to ground. Drivers entering through a gate can be instructed to park a chassis/container or to discharge the container to ground. A large number of tractors and chassis enter from the outside and some drivers and equipment do not always belong to the terminal and are not permanently tagged. As shown in the example high level flow chart of FIG. 6, additional step(s) can be added for check-in. A temporary tag can be affixed to a chassis or container as it enters the gate.

As illustrated, a driver arrives at the gate (block 550) and a clerk notes the container and other information (block 552). A tag is affixed to a chassis or container (block 554) and the driver takes receipt indicating the suggested parking location or ground assignment (block 556). A determination is made whether it is parked or grounded (block 558). If the determination is made to park, the driver parks the container and disconnects (block 560) The location system 20 reports the position of the container when it was parked (block 562). When a container is required, it is found wherever the driver parked it (block 564). If a decision at block 558 was made for a grounded container, a determination is made whether the container went to the top handler as instructed (block 566). If not, the driver parks the container and disconnects (block 568) and the process continues such that the location system 20 reports the position of the container when it was parked (block 562).

If the top handler was instructed at block 566, the driver brings the trailer to a top handler queue (block 570). The top handler moves the container from the trailer to stack (block 572). The location system reports the position of the container when it was parked (block 574). The clerk confirms the stacked location (block 576). When the container is required, it is found where it was discharged to ground (block 578).

The infrastructure, tracking devices and software as described can support the tracking of container handling equipment (CHE) and third party truckers (draymen) via a gate 34 to enable an automated hand-off of the container ID to a terminal operating system (TOS) 24. The location system 20 can support an automated update of the ground position 40 of a container in the terminal, whether it is delivered by a truck or UTR (utility tractor rig) to system enabled Front End Loaders (FEL). A flow process for a draymen for gate to ground could include a permanent or temporary mount location system tag 28 on the draymen tractor or chassis. This tag 28 could be triggered by a port device 50 as the chassis passes through an optional optical character recognition (OCR) portal 36, which could automatically associate the tagged ID to an OCR record.

A port device 50 could be located in each gate lane of the gate 34 for automatic tag/transaction association and could assign an OCR portal transaction to the correct lane. A Front End Loader could have a port device 50 that forces the draymen or chassis tag to transmit its ID and the associated container ID could be automatically transferred to the Front End Loader. This could be tracked until the container is grounded. Sensor information collected by a Position Tracking Interface Unit (PTIU) 58 or similar telemetry unit could collect sensor information and transmit it via the Front End Loader's tag in a manner described before. Sensor information could be received and the X,Y position for the Front End Loader tag could be determined upon container disengage. At the marine terminal server 22, the location of the sensor information could be translated to a bay, cell and tier position and updated to the terminal operating system 24.

For a gate to wheels scenario, the location system 20 could compare a park instruction with a park signature created by a draymen visiting the marine terminal. For example, a permanent or temporary tag could be located on the draymen's tractor or chassis and the tag read by the port device 50 as the draymen passes through an optional OCR portal 36, which automatically associates the tag ID for an OCR record. A port device 50 could be located at each gate lane at the gate 34 for automatic tag/transaction association and assigning the OCR portal transaction to lanes. The processing for the container can be learned by querying the Terminal Operating System 24, tracking the container, and monitoring it to ensure a grounded instruction is adhered. The draymen could leave the container in the chassis or bear the chassis into the marine terminal. The tag's position is automatically determined with no need for a mobile inventory vehicle or magnet retrieval. A wheeled position is updated to the Terminal Operating System.

The location system 20 is also operative for a vessel or rail-to-ground and supports an automated association of the container ID at the vessel for tracking a container ID to a wheeled or grounded position 38,40 in the yard of the marine terminal. The container ID can be associated to the Utility Tractor Rig (UTR) in this example. For example, a quay crane 52 OCR or rail OCR portal could be used to automatically capture a container ID and the container and UTR are automatically associated based on UTR sensor sweep and location. A port device on a transtainer and a UTR tag automatically transfer ownership of the container to the transtainer. The transtainer is located and the container disengaged to determine an X,Y position. Other sensors, for example, operative with the PTIU 58 could be used to determine a Z position, as explained in greater detail below. The transtainer disengaged location can be translated to a bay, cell, tier position, or other position for the container and updated to the Terminal Operating System 24.

The system as described can also be used for vessel or rail-to-wheels in which the quay crane OCR or rail OCR portal automatically captures the container ID. The container and UTR are automatically associated based on UTR sensor sweep and location. The UTR's location can be recorded upon chassis disengage and the UTR automatically shows is available for its next assignment. The UTR's disengaged location can be translated to a row or slot position for the container and updated to your TOS.

The Position Tracking Interface Unit (PTIU) 58 can be located on UTR's, side handlers, top handlers, reach stackers, straddle carriers, RTG's and other container handling equipment, and can transmit equipment sensor data through the tags 28 into the location System 20 for processing by the server 22. Sensor transmissions can be simplified by providing a common platform for the container handling equipment. The PTIU 58 can monitor what equipment is moving, who was using the equipment (with operator logon), what the equipment is doing, such as idling or moving a container, and other diagnostic data, such as fuel level while the equipment is in operation. The PTIU 58 can respond to events allowing the location system 20 to update what that specific equipment did when the PTIU 58 sends data to a tag 28. For example, when the operator of a RTG moves the RTG spreader, no events are sent to the location system 20. When an operator locks the spreader on a container, however, the PTIU 58 sends this event data to the location system 20 because it affects the location of container inventory.

The PTIU 58 can monitor any required sensors and respond to correct events that affect container inventory. For example, for a top handler or RTG, the events of locking onto a container and moving the container could be similar, although sensors sense this as different. For a UTR, the monitored events could be the fifth wheel being engaged/disengaged and the presence of a container. The events and sensors used may be different depending on the container handling equipment.

Figure 7:
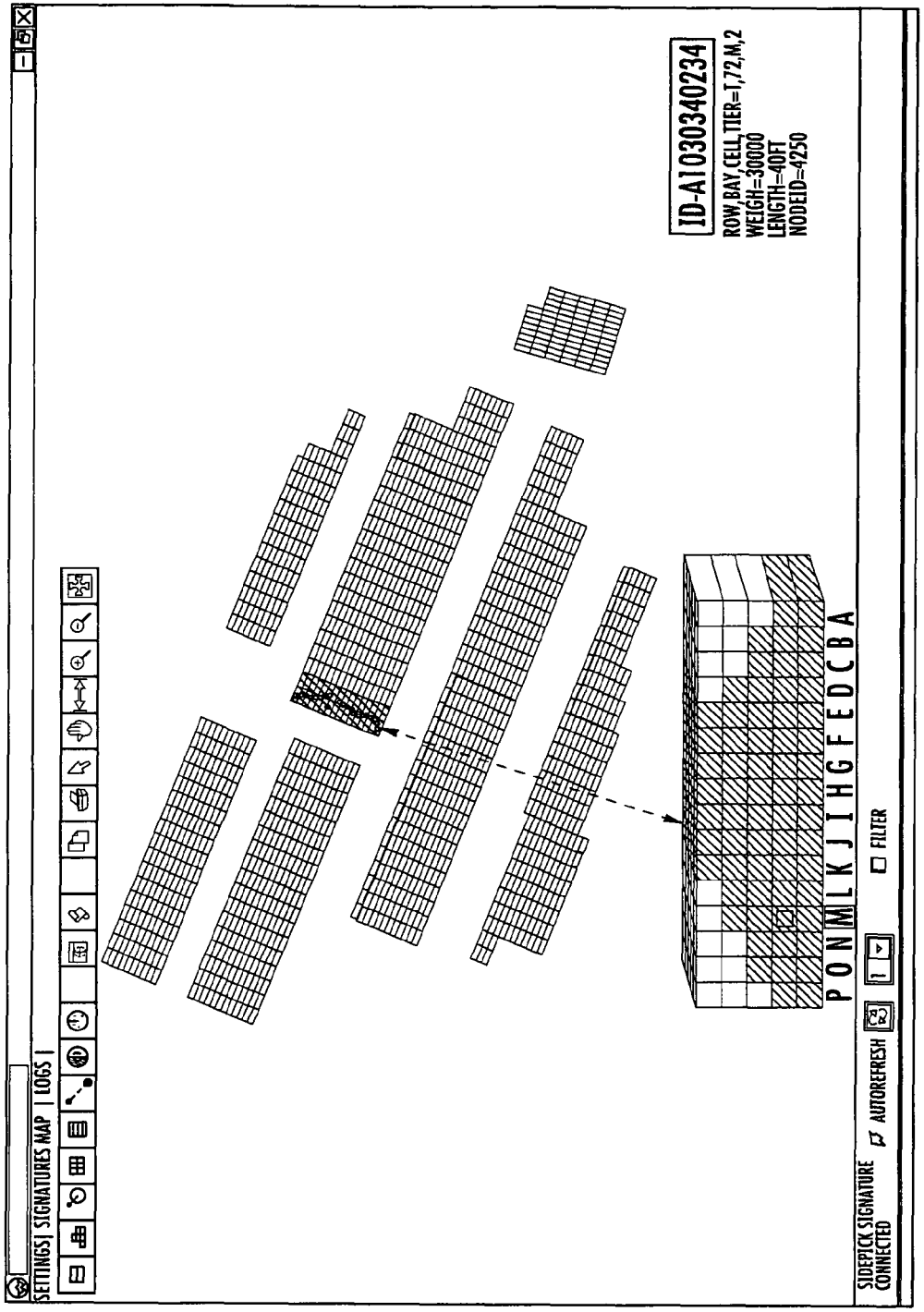
FIG. 7 is an example of a computer window as a graphical user interface for a container stacking console.
Figure 8:
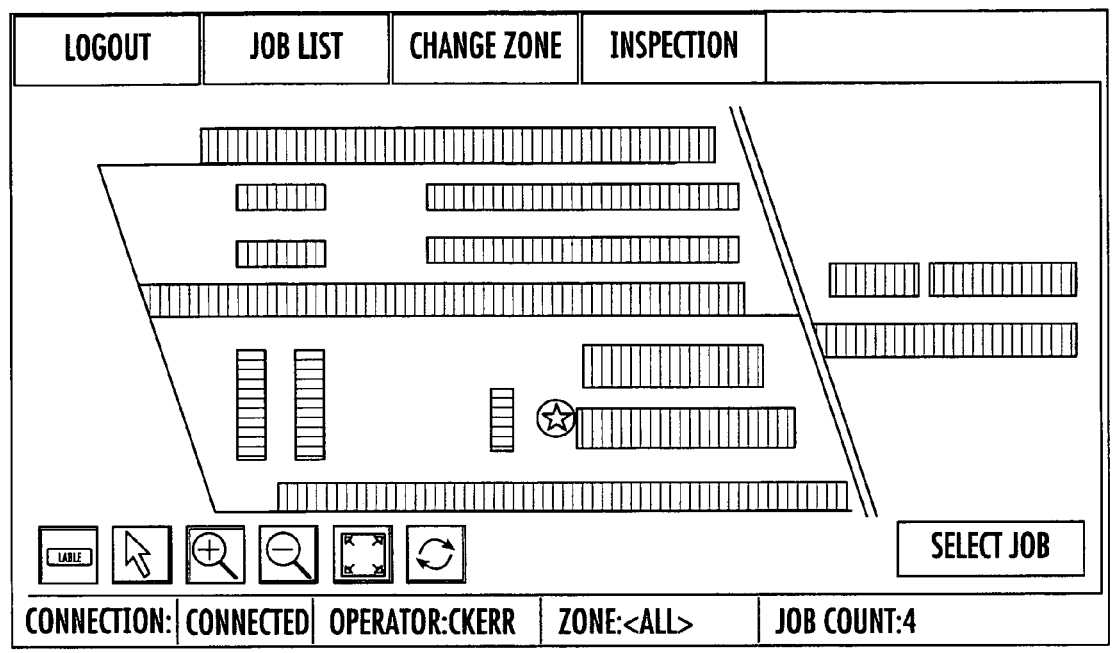
FIG. 8 is an example of a computer window as a graphical user interface for a switcher user interface.

The server as a location processor can include appropriate software to process data received from the PTIU 58, such as to provide an open computer window corresponding to a signature processing console for each type of container handling equipment located in the marine terminal. A new position for a container can be translated from an X,Y,Z position in the terminal to a row, bay, cell and tier position and passed through the Terminal Operating System 24. An example of an open computer screen window for a container stacking console is shown in FIG. 7, showing a layout of different container positions in the top portion of the window and an isometric representation of stacked containers in the lower portion, as selected and indicated by the dashed lines. Location information can also be shared with UTR drivers or other operators of container handling equipment and a user interface could be leveraged with a switcher user interface as shown in FIG. 8.

As noted before, the location system 20 as developed in the system and method can identify ISO containers arriving at the marine terminal with port devices 50 as described before, and locate these containers when they are stored on flat trailers, e.g., chassis, in the main staging yard as wheeled operations. The containers can arrive through a main gate and be scanned by port devices 50 as described above, or by rail and loaded by transtainers, as also described above, or arrive by ship and loaded by cranes onto a UTR-pull chassis in a similar process to a rail process. These "wheeled" containers are parked in the yard, for example, by the incoming drayage driver (draymen), or by a longshoreman hosteller (UTR) driver. The location system 20 maintains a constantly updated ID and location record of all wheeled containers located in the yard.

Figure 9:
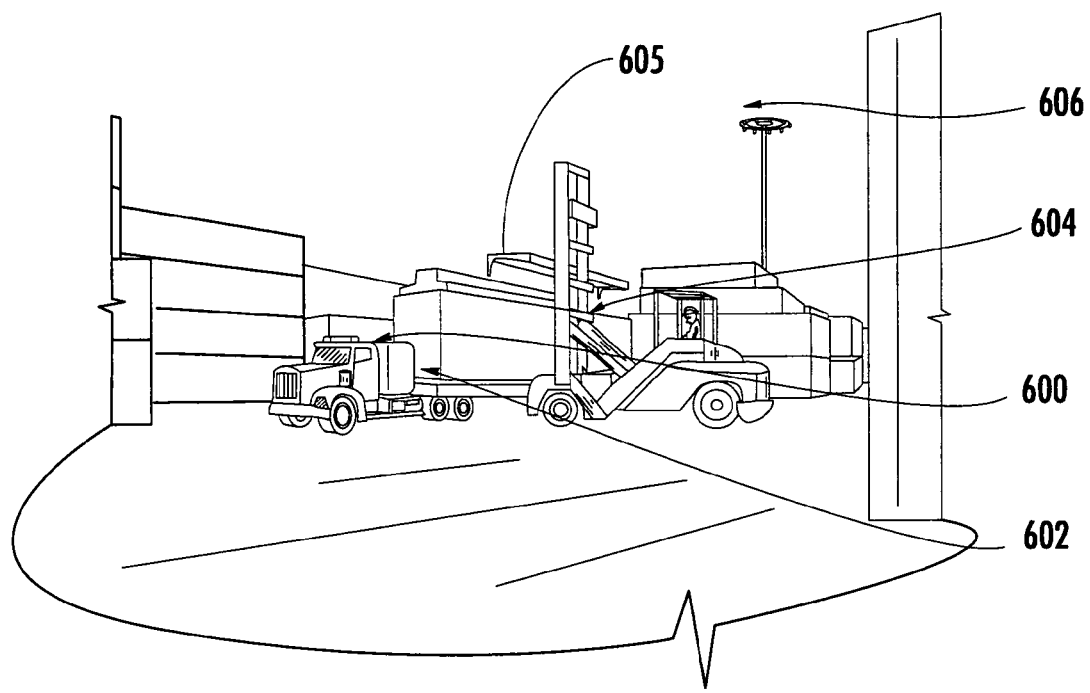
FIG. 9 is an environmental view of a top pick, drayage tractor and chassis with the top pick unloading the container.
Figure 10:
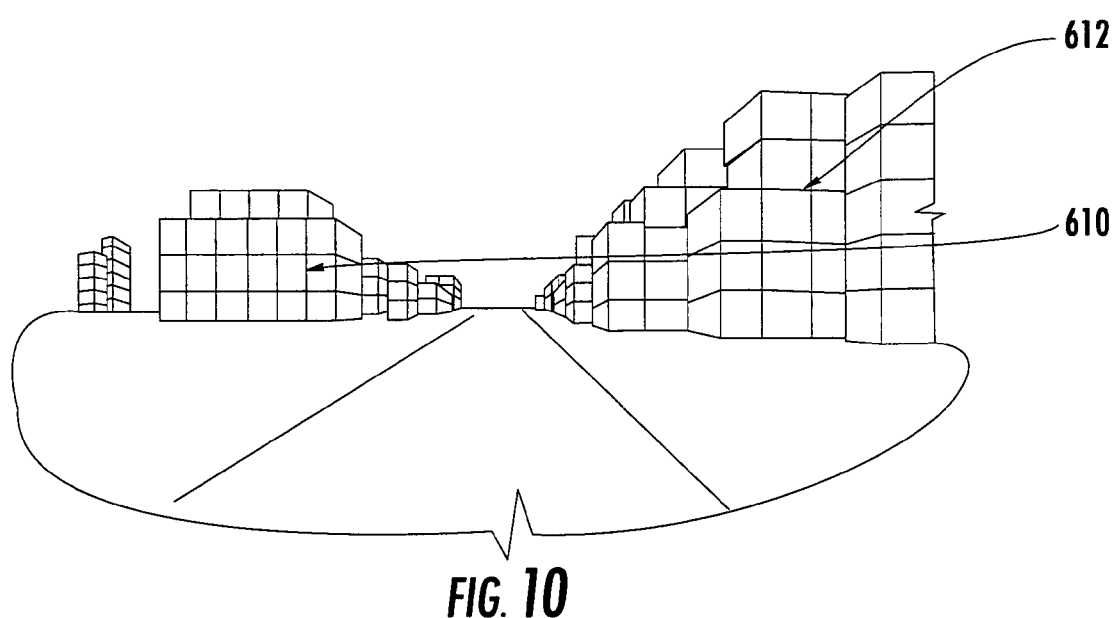
FIG. 10 is an environmental view showing stacked containers.

Most wheeled operations use a chassis that is tagged. Containers arriving into the yard on non-owned chassis could be off-loaded by a "top pick" (e.g., also referred to as a "top pick spreader") loader and stacked on the "ground" so that the outside draymen can take the chassis as it leaves. FIG. 9 shows a drayage tractor 600 having a tag, and a marine terminal owned chassis 602 with a tag. The top pick is illustrated at 604 within a horizontal top pick spreader 605 for grabbing containers and the access point is shown generally at 26. The antenna mast 606 supports the access point. The antenna mast 606 and access point could include a GPS unit. The ID and location of each container in the "grounded stack" to its exact position in X,Y,Z coordinates is preferred, especially when there are many stacked containers as shown in FIG. 10, showing full containers generally at 610 that are stacked "four high" and empty containers generally at 612 that are stacked "five high."

Figure 11:
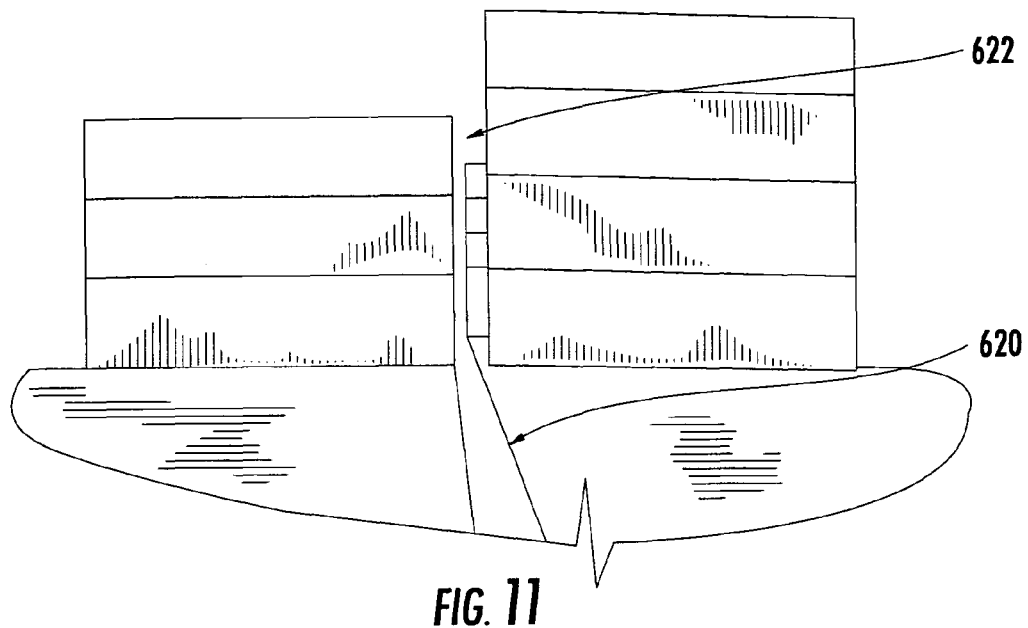
FIG. 11 is an environmental view showing stacked containers and a 1½ foot gap between containers for top pick spreaders.

The grounded containers normally, but not always, have their positions marked on the pavement as shown by the position lines 620 of FIG. 11. In one non-limiting example, the containers are 8.5 feet wide, 8.5 to 9.5 feet high, and have 20-foot, 40-foot, 45-foot and 48-foot lengths. Spacing between the stacks made by any top pick loaders typically have a minimum of about 1.5 feet for transtainers that have a greater spacing to accommodate the rail-guided loader as generally shown by the spacing 622 between the two stacks of containers. In one non-limiting example, stacks can be five containers high for empty containers, which typically are about 80% of outbound containers, because the U.S. does not export many containers. Full containers can be stacked up to four high and the stack depth can be variable. The 1.5 foot gap 622 is usually left between the containers for top pick spreaders with port devices on the ends of the spreader that must fit in the area and not be damaged. The chalk outline 620 shows the marked outline of the storage area for containers.

Figure 12:
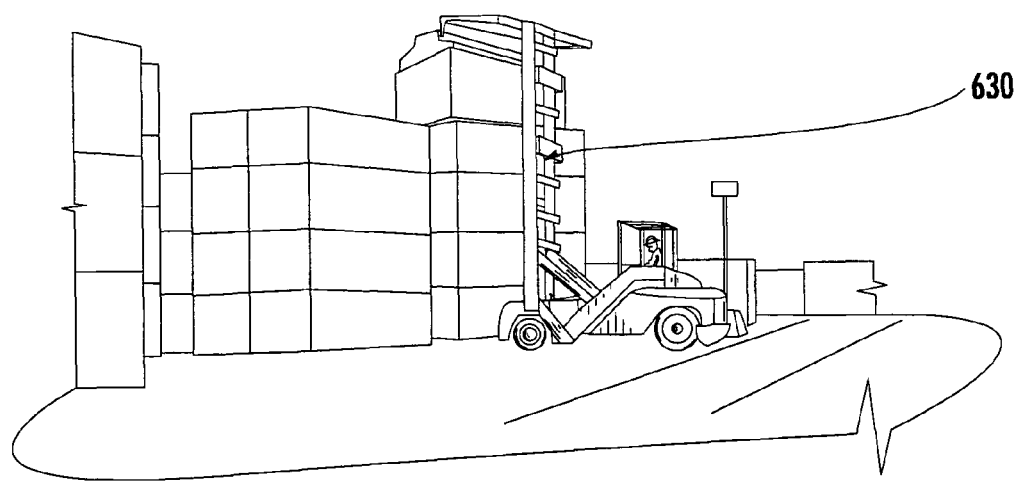
FIG. 12 is an environmental view showing a top pick placing a container on top of a stack.

Load and unload operations can be performed quickly, allowing container locations that are associated with loader locations to be captured in less than two seconds to avoid errors in one non-limiting example. As shown in FIG. 12, the highest fixed point 630 on the top pick spreader is above the top of the third level container, about 30 feet. Because much of the marine terminals in the world are grounded for yard space and input/output efficiency, the grounded operations are becoming increasingly important.

Figure 13:
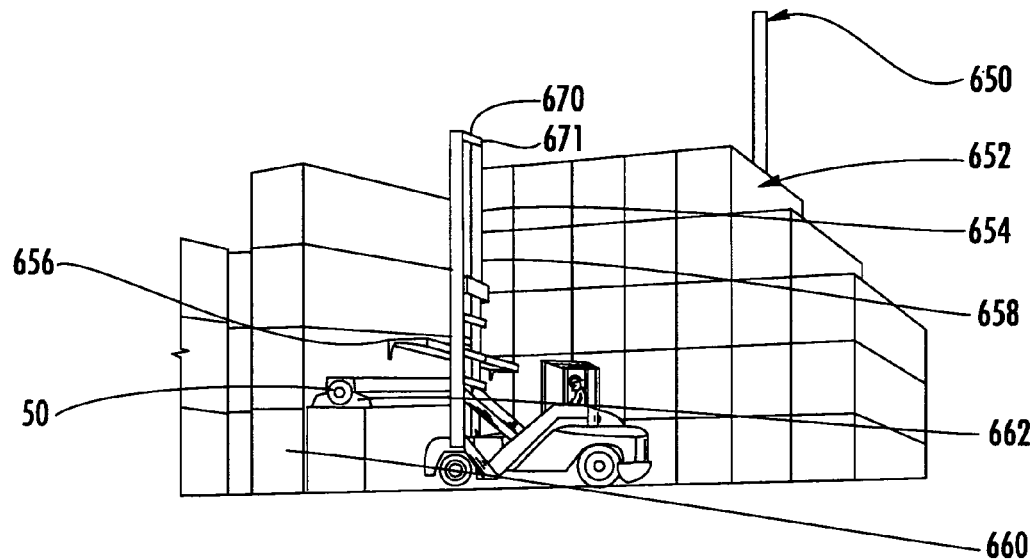
FIG. 13 is an environmental view showing a top pick moving a container and a vertical antenna positioned on the top pick.

Although it is possible to include tags on containers, the system and method in accordance with one non-limiting example of the invention can have the location of the containers inferred from real-time association with the container handling equipment, which places and removes them from the grounded stack and carrier chassis. FIG. 13 shows an antenna 650 locating access point, 8½ foot stacked containers 652, an 18-foot vertical whip antenna on the top pick spreader 654 with the point shown at 656 on the top pick spreader for mounting the antenna, and 9½ foot containers 660. The whip antenna for a tag transmission could be formed instead as a mast, which supports a set of tags as explained below. Port devices 50 as interrogators can be positioned on each end of the top pick spreader bar as indicated generally at 662 for scanning a tag positioned on a carrier chassis.

It should be understood that sensors on the handler can indicate the placement of a container, the release of a container, and the height of a gripper when an action occurs (Z dimension value). This information could be sent with telemetry data from a PTIU 58 using the tag 28 and simultaneously associating the container handling equipment location with the data for the transaction. A port device 50 as an interrogator induces the blink from the chassis tag and/or the drayage tractor tag to associate the container ID with the data from the handler tag.

Non-marine terminal chassis can be pulled by non-tagged drayage tractors and can be manually entered at the terminal from a video photo of a painted-on container number taken during a transaction. This photo could be automatically requested from the container handling equipment, over the local area network that forms part of the location system 20, if no port device 50 induced blinks with the correct port device ID were detected during the chassis placement. Optical character recognition (OCR) could be used, but may not be desirable because gate operations using OCR have demonstrated only about a 95% scan success rate. Also, the vibration of the handler could degrade the OCR performance even more than stable gate scanners. A two-second association window created by a handler quick movement could cause further degradation of OCR performance.

Figure 14:
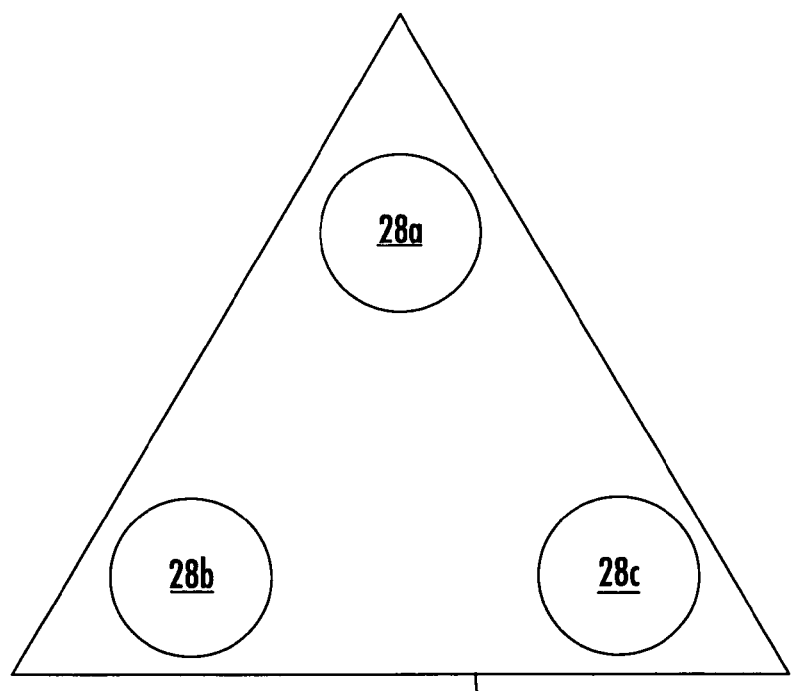
FIG. 14 is a fragmentary plan view of a mounting plate for three tags located on top of the top pick antenna mast.

Because the handler moves quickly, the tag on the handler could include a set of tags to ensure instantaneous location accuracy. For example, three tags 28 as RF emitters or transmitters could be simultaneously triggered by a telemetry unit from recognized handler transactions. These tags could be set for a minimum trigger delay of about 600 milliseconds with standard multi-tag scan dither on the trigger. Each tag could produce four sub-blinks with a normal 125 millisecond dithered spacing, creating a maximum time diversity within the short burst window. Three, one-quarter wavelength, tags 28a, 28b, 28c could be mounted near the corners of a triangular mounting plate 670 forming a counterpoise as shown schematically in FIG. 14. This plate 670 provides a ground plane and prevents reflections from containers below. The plate 670 is mounted on the mast 654 in one non-limiting example. The tags are typically spaced about ¼ wavelength. This type of configuration could provide spatial diversity with a minimized radio frequency radiation below the antenna radiator horizon. This configuration could also minimize some multipath from containers and other metal objects below the emission point height. The three RF transmitters can provide some filtering also.

Because the location of the handler must be as accurate as possible, the typical RF emission from the handler tag should be line-of-sight in a preferred embodiment to the existing infrastructure of the location system 20. This is accomplished using the separate antenna mast 654 on the handler to rise above the top plane of the stacked containers. An existing 18-foot fibreglass antenna mast as used for vertical diversity on yard light poles in the marine terminal could be used. The triangular mounting plate 670 supporting the tags at the top and a new mount for attachment to the highest fixed location on the top pick spreader. The transtainers are high and the mast should clear the surrounding structure of the loader. Some mechanical flexibility could be provided on the top pick spreader for overhead obstacles, such as maintenance garage doors and overhead utilities and conveyors. A GPS sensor 670 as part of the roving receiver unit could also be located on the mast 654 to provide additional location ability and redundancy overlay. When the GPS is blocked, the RTLS is used, or both GPS and RTLS 20 used. If the RTLS infrastructure is blocked, the GPS could provide location. In accordance with a non-limiting example, the DGPS system is used. Also, in accordance with a non-limiting example, one RF signal could be used for DGPS on the WLAN.

Figure 15:
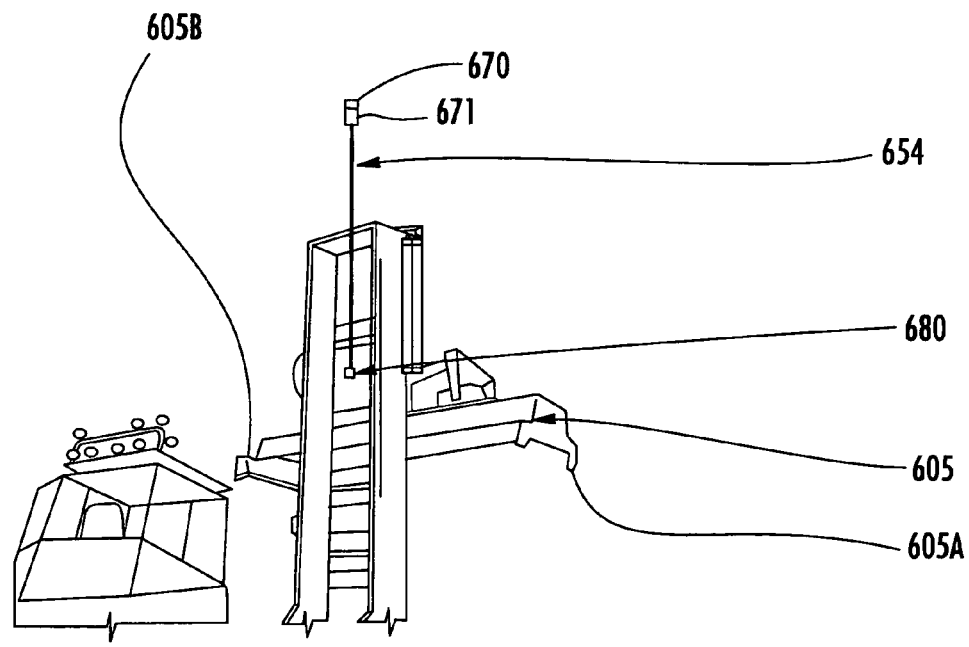
FIGS. 15 and 16 are environmental views of a top pick and its top pick spreader showing the antenna mast in FIG. 15.
Figure 16:
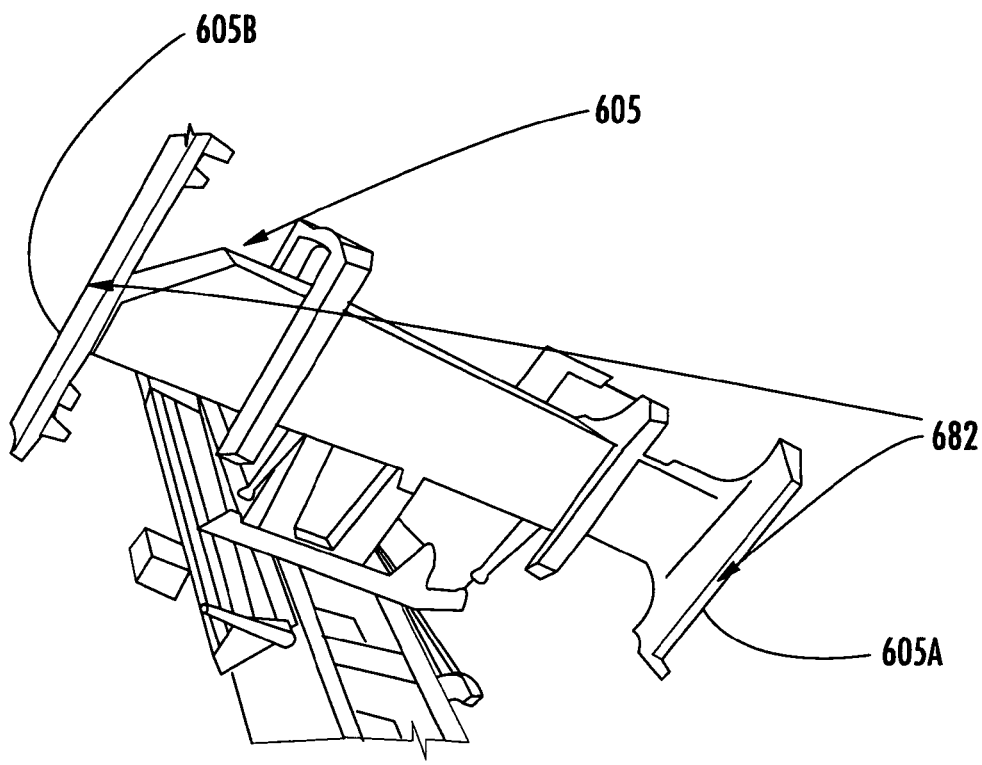

FIGS. 15 and 16 show two views of a top pick spreader 605 having an 18-foot antenna mast 654 with a bar 680 for an antenna mount, and port device 50 mounting points 682 (FIG. 16). The port devices 50 should be mounted at both ends of the top pick spreader 605 at its gripper 605a, 605b on either end because orientation to the tagged end of a container on a chassis is unknown. The port devices 50 should be mounted under a spreader and plate to prevent damage from adjacent containers during placement and removal operations from the stack. Electrical connection to a port device antenna should be flexible enough to accommodate 20-foot to 45-foot container width handling.

The location accuracy in a grounded stack should typically be about +/−10 feet (for 20-foot containers) for container length, and about +/−4 feet for container width. The Z dimension in the stack is typically up to about five containers high. Occasionally, containers will be temporarily grounded in areas other than the marked, grounded stacks. These containers should be identified as not in a stack, but actual location indication could be zone only. Port devices 50 can be used to associate containers on marine terminal chassis and/or with tagged drayage tractors with loaders. Association with containers on chassis, pulled by untagged draymen, is a challenge as previously described. This could result from the structure of the top pick and the combination of the tractor, container and chassis.

In one non-limiting example, containers arriving on tagged marine terminal chassis and/or pulled by tagged drayman are tracked, and untagged transactions by OCR or video camera are not required.

A PTIU 58 or similar module can be connected to top pick sensors for (a) container pick (removal); (b) container release (placement); and (c) height of operation. A special tag could include: (a) data input and blink trigger; and (b) 50 ohm RF output connector.

The RF antenna mast with mounting plate 670 used on the top pick could include the three element radiator formed by three tags 28*a*, 28*b*, 28*c* with sufficient separation for: (i) minimized coupling and pattern distortion; (ii) adequate spatial diversity; and (iii) minimum footprint to the top mount on the antenna mast. This RF antenna could also include an upward hemispherical pattern with minimized radiation below the horizon of the counterpoise and a mast long enough for a two-foot rise above the plane of highest container stack. Special port devices 50 can be used with top pick, and include different circuits and structural functions, for example, (a) pot and shock mount electronics; (b) a separate antenna; (c) a flexible connection cable to the ends of the spreader; (d) a weather shield; (e) damage protection; and (f) verify port device coverage in the environment.

Both magnetic compass and inertial navigation techniques can be used for optimization of loader position information. Application specific location algorithms can be used for: (a) X,Y,Z location of all containers in the grounded stack and zone location when not in stack; (b) discerned placement and removal operations from the stack; (c) associated tags on the chassis and/or drayage tractor, and therefore, a container ID with containers placed or removed by top pick; and (d) the associated three tags in a tag set, which are tied to each top pick event for improved location accuracy, allowing blinks to be sent in less than a 1.5 second window. Application software can be used for location of all containers in the grounded stack and stored in the asset manager, and an isometric display of container in exact current form stack from planar map zoom.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A location system for tracking assets within a terminal, comprising:
   a differential global positioning system (DGPS) reference receiver within the terminal that receives GPS signals and generates DGPS correction data;
   a roving receiver unit carried by an asset to be tracked within the terminal, and comprising a GPS receiver that receives GPS signals and the DGPS correction data from the DGPS reference receiver and a tag transmitter operative for transmitting a wireless RF signal containing GPS location data based on received GPS signals and DGPS correction data;
   at least one access point positioned within the terminal for receiving the wireless RF signal from the tag transmitter; and
   a location processor operatively connected to the at least one access point for receiving GPS location data and determining a location of the asset to be tracked.

2. The location system according to claim 1, and further comprising a plurality of spaced apart access points positioned at known locations within the terminal and operative with the roving receiver unit and the location processor as a Real Time Location System (RTLS) for augmenting any positioning determination based on GPS.

3. The location system according to claim 2, wherein said processor is operative for determining which signals are first-to-arrive signals and conducting differentiation of the first-to-arrive signals relative to the access points to locate the tag transmitter.

4. The location system according to claim 1, wherein said RF signal comprises a pseudo random spread spectrum RF signal.

5. The location system according to claim 1, wherein said at least one roving receiver unit, at least one access point and location processor comprise a wireless local area network (WLAN).

6. The location system according to claim 1, wherein said roving receiver unit further comprises a receiver processor for caching GPS data relating to a number of sensed locations and compiling said data into a single data packet for transmission.

7. The location system according to claim 1, wherein said processor is operative for processing real time algorithm output data as differential or kinematic baseline vectors for GPS differential processing.

8. The location system according to claim 7, wherein said processor is operative for processing the algorithm output data within a North-East-Down (NED) system.

9. The location system according to claim 1, wherein said asset to be tracked comprises container handling equipment or a container.

10. The location system according to claim 9, wherein said RF signal is transmitted from the tag transmitter based on an event affecting the location of a container handled by container handling equipment.

11. The location system according to claim 1, wherein said GPS receiver generates GPS data and further comprising a RF transmitter operative for transmitting a wireless RF signal containing GPS data and at least one access point positioned within the terminal for receiving the wireless RF signal from the RF transmitter.

12. A location system for tracking assets within a terminal, comprising:
   a differential global positioning system (DGPS) reference receiver within the terminal that receives GPS signals and generates DGPS correction data;
   a plurality of assets to be tracked within the terminal, each asset having a roving receiver unit carried by the asset and comprising a GPS receiver that receives GPS signals and the DGPS correction data from the DGPS reference receiver and a tag transmitter operative for transmitting a wireless RF signal containing GPS location data based on received GPS signals and DGPS correction data, wherein said RF signals transmitted from each tag transmitter are transmitted randomly in time;
   a plurality of access points positioned at known locations within the terminal for receiving wireless RF signals from the tag transmitters; and
   a location processor operatively connected to the plurality of access points for receiving GPS location data and determining a location of the assets to be tracked, wherein said plurality of spaced apart access points are operative with the roving receiver units and the processor as a Real Time Location System (RTLS) and communicate as a wireless local area network (WLAN) for augmenting any positioning determination based on GPS.

13. The location system according to claim 12, wherein said processor is operative for determining which signals are first-to-arrive signals and conducting differentiation of the first-to-arrive signals relative to the access points to locate the tag transmitter.

14. The location system according to claim 12, wherein said RF signal comprises a pseudo random spread spectrum RF signals.

15. The location system according to claim 12, wherein each roving receiver unit further comprises a receiver processor for caching GPS data relating to a number of sensed locations and compiling said data into a single data packet for transmission.

16. The location system according to claim 12, wherein said processor is operative for processing real time algorithm output data as differential or kinematic baseline vectors for GPS differential processing.

17. The location system according to claim 16, wherein said location processor is operative for processing the algorithm output data within a North-East-Down (NED) system.

18. The location system according to claim 12, wherein said assets to be tracked each comprise container handling equipment or a container.

19. The location system according to claim 12, wherein each GPS receiver generates GPS range records and further comprising a RF transceiver operative for transmitting a wireless RF signal containing GPS data and a plurality of access points for receiving the wireless RF signals.

20. A method for tracking assets within a terminal, comprising:

generating differential global positioning system (DGPS) correction data from a reference receiver located within the terminal;

transmitting a wireless RF signal from a tag transmitter containing GPS location data based on GPS signals received within a roving receiver unit carried by an asset to be tracked within the terminal and DGPS correction data received from the DGPS reference receiver;

receiving the wireless RF signal from the tag transmitter within at least one access point positioned within the terminal; and processing the data received within that at least one access point using a location processor operatively connected to the at least one access point to determine a location of the asset to be tracked.

21. The method according to claim 20, which further comprises augmenting the processing using a Real Time Location System (RTLS).

22. The method according to claim 20, which further comprises determining which signals are first-to-arrive signals and conducting differentiation of the first-to-arrive signals relative to a location of a plurality of access points to locate a tag transmitter.

23. The method according to claim 20, which further comprises caching GPS data relating to a number of sensed locations and compiling said data into a single data packet for transmission.

24. The method according to claim 20, which further comprises processing real time algorithm output data as differential or kinematic baseline vectors for GPS differential processing.

25. The method according to claim 20, which further comprises generating GPS data and transmitting wireless RF signals containing the GPS range records at a plurality of access points.

* * * * *